May 5, 1970  E. H. EBERHARDT  3,510,662
OPTICAL RADAR SYSTEM WITH PHOTOMULTIPLIER AND ASSOCIATED
CIRCUITRY HAVING TIME CONSTANT LONG ENOUGH TO PERMIT
"PILE-UP" OF SIGNAL PULSE BUT SHORT ENOUGH
TO KEEP NOISE PULSES SEPARATED
Filed Oct. 24, 1965
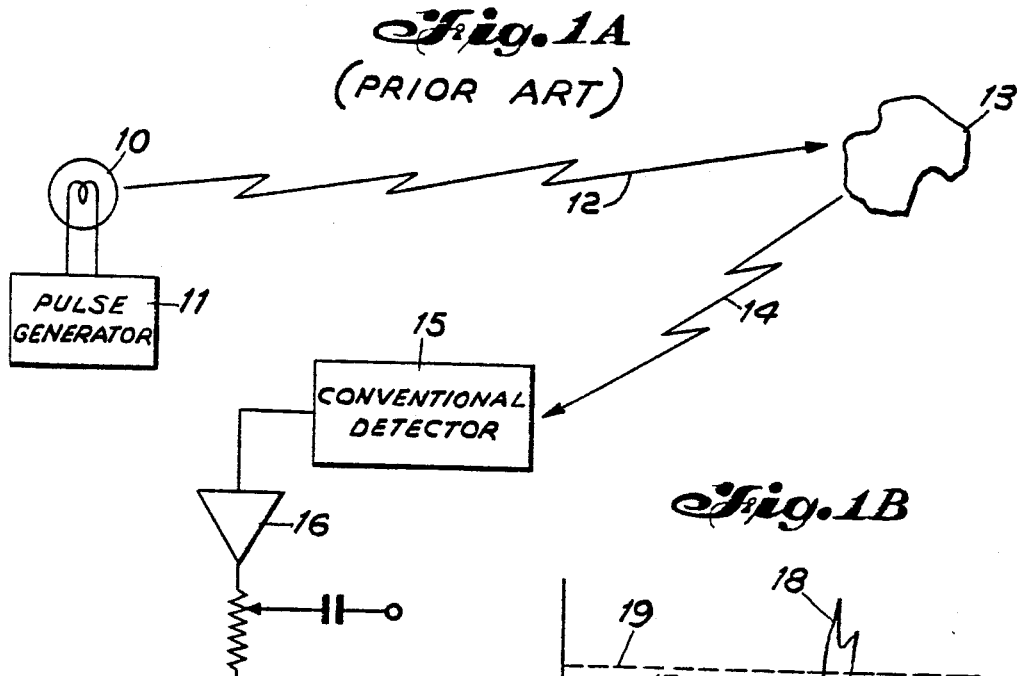
Fig. 1A (PRIOR ART)
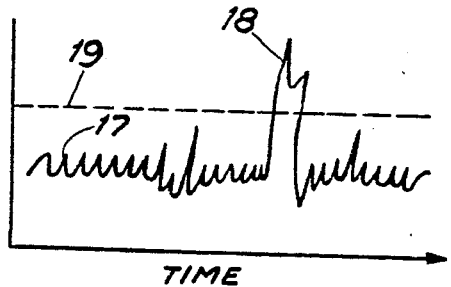
Fig. 1B
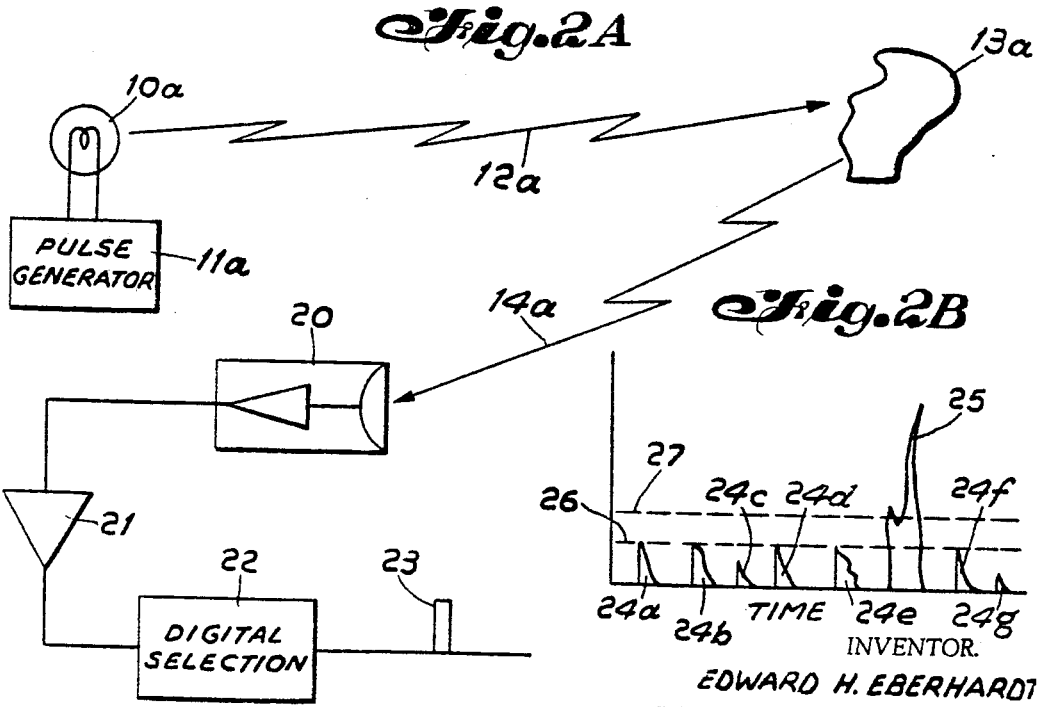
Fig. 2A
Fig. 2B
INVENTOR.
EDWARD H. EBERHARDT
BY Richard S. Seligman
ATTORNEY United States Patent Office 3,510,662
Patented May 5, 1970

3,510,662
OPTICAL RADAR SYSTEM WITH PHOTOMULTI-
PLIER AND ASSOCIATED CIRCUITRY HAVING
TIME CONSTANT LONG ENOUGH TO PERMIT
"PILE - UP" OF SIGNAL PULSE BUT SHORT
ENOUGH TO KEEP NOISE PULSES SEPARATED
Edward H. Eberhardt, Fort Wayne, Ind., assignor to International Telephone and Telegraph Corporation, Nutley, N.J., a corporation of Maryland
Filed Oct. 24, 1965, Ser. No. 504,521
Int. Cl. H01s 39/12
U.S. Cl. 250—214                                    8 Claims

ABSTRACT OF THE DISCLOSURE

A light pulse generator transmits narrow pulses which after reflection are detected by a photomultiplier and amplified. The amplifier has a bandwidth sufficient to pass noise current pulses produced by random photoelectrons that are separated in time by at least the width of a noise pulse. The photoelectrons induced by the reflected light pulses are more numerous and cause closely spaced and overlapping current pulses to exist, which due to the restricted bandwidth of the amplifier, yield pulses greater in amplitude than the noise pulses. The output of the amplifier is connected to a pulse amplitude discriminator for final detection.

This invention relates to a detector for optical radar, and, more particularly, to a noise suppressing detector for optical radar employing a novel type of pulse amplitude discrimination.

Conventional light detectors, used extensively in optical radar systems, employ amplitude clipping circuitry in an attempt to single out the reflected light occasioned signal peaks from the usual noisy signal. The overall signal typically consists of a continuously varying *analogue* having a parameter (current or voltage) which fluctuates as a function of time. This parameter, ideally, undergoes a substantial magnitude deviation at the time in which a return light flux signal is received. If this parameter, actually, does experience a substantial magnitude change during the detection period, then a clipper circuit can be employed to remove the noisy fluctuations, allowing only the return light flux created signal to remain. Of course, if the peak light flux created signal is not large in comparison to the noisy fluctuations then the clipping level must be lowered, and serious spurious indications will occur if the random noise fluctuations exceed this lower clipping level.

A fundamental and significant characteristic of this conventional detection method is that the number of random spurious accidental indications increases rapidly with enlarged circuit bandwidth, according to well known principles as described below. Thus, as light flux pulse width is decreased to achieve greater range information accuracy in optical radar systems, and correspondingly detector circuit bandwidth is increased, the number of spurious signal indications increases excessively.

Accordingly, it is an object of this invention to provide a detector for optical radar in which the detected light flux signal magnitude substantially exceeds spurious signal indications.

Another object of this invention is to provide a detector for optical radar in which increased bandwidth does not statistically increase the number of random spurious accidental indications.

Still another object of this invention is to provide an optical detector in which signal and noise are resolved into individual pulses of significantly different peak amplitudes.

In achieving the foregoing objects, the present invention provides an optical radar scheme in which the employed light pulses have very short durations, and in which the echo or reflection signal detector has a high gain. Furthermore, very high bandwidth output circuitry is employed, in order that the output signal from the detector will be of a *digital* nature and consist of individually resolved pulses. However the maximum bandwidth is restricted by the additional requirement that the detector in combination with the external circuitry must possess a time constant such that the group of photoelectrons generated by a return light pulse will "pile-up," or add together, to produce a large output pulse, while noise pulses from individual photoelectrons will not "pile-up."

The above-mentioned and other features and objects of this invention will become more apparent by reference to the following description taken in conjunction with the accompanying drawings, in which:

FIG. 1A is a simplified block diagram illustrating in part a conventional optical radar system;

FIG. 1B illustrates a typical output which can be expected from the system of FIG. 1A;

FIG. 2A is a simplified block diagram illustrating in part an optical radar system according to the invention; and FIG. 2B illustrates a typical output which can be expected from the system of FIG. 2A.

FIGS. 1A and 1B illustrate a conventional optical radar system and representative output waveforms therefrom, respectively. A light source 10 is driven by a pulse generator 11 and emits a light flux signal along a path 12. Upon striking an object to be detected 13 the light flux signal is reflected along a path 14 to a detector 15. The output from detector 15 can be expanded at an amplifier 16 the object of the device being to detect the presence or absence of pulse 18 and its time of occurrence with respect to the pulse of light from source 10. A typical output is shown in FIG. 1B; the output signal having a continuously variable *analogue* parameter 17, such as a current or voltage, which fluctuates as a function of time. The portion of the signal generated solely as a result of return incident light flux upon detector 15 is shown as a pulse 18. If this pulse is of a greater magnitude than the random noise fluctuations of the analogue parameter 17, it can be detected by clipping circuitry which operates to remove all signal below a predetermined bias level 19.

This system has inherent disadvantages which the subject invention overcomes. The light source 10 must emit a relatively strong signal in order that any reflections be of sufficient strength, such that detector 15 can produce a signal 18 substantially larger than the random noise fluctuations. It should be noted that amplifier 16 will amplify noise as well as actual light flux created signal.

To achieve accurate ranging, it is a requisite that the duration of the light pulse emitted from source 10 be very short. It necessarily follows that if the light pulse width is decreased, bandwidth must be increased to provide proper accuracy of time of occurrence determination. Consequently, noise also increases; and with an increase in noise the possibility of spurious noise created pulses exceeding bias level 19 statistically increases.

These problems can be overcome using the novel detection system shown in FIG. 2A. As illustrated, a light source 10a, which for example could be a laser, is driven by a pulse generator 11a and emits a pulse of light along a path 12a. An echo of the emitted pulse from an object to be detetcted 13a, along a path 14a, consisting of a group of individual light photons is sensed by a detector 20. Detector 20 has a high internal charge gain such that each photo incident at the input thereof and ejecting a photoelectron from the photocathode will cause a large individually detectable burst at the output of detector 20; as described by Eberhardt (IEEE, Tr. on Nuclear Science, vol. NS–11, No. 3, 48–55, June 1964).

To simplify the description of the invention the detector will be assumed to be a multiplier phototube (photomultiplier), though it will be obvious to those skilled in the art that any very high gain, very low noise component or components could be used in substitution therefor.

In the prior art system, hereinbefore described, it was shown that decreasing the emitted light pulse width along with the necessary increased circuit bandwidth increased noise to a point where differentiation between signal and noise becomes difficult, hence lowering detection capability. In the novel system herein described decreased light pulse width is a necessity to maintain good detection capability. If the pulse width is decreased to a value less than the time constant of the detector there will be an overlap between the several photoelectrons produced per optical pulse; that is, the group of photoelectrons produced by the detected light pulse will produce a "pile-up" of pulses at the anode or collector of the photomultiplier creating a large signal pulse. It should be noted that noise created single photoelectron pulses at the anode do not "pile-up" to any appreciable degree, largely because of their random nature.

The output from detector 20 is applied to a circuit 21, which, for example, can be a wide bandwidth pulse amplifier; and the output from circuit 21 is coupled to a digital selection circuit 22, which, for example can be a pulse amplitude discriminator. The output from discriminator 22 is the detected return signal pulse 23. One function of circuit 21 is to act as an impedance match coupling between detector 20 and digital selection circuit 22; for example, to convert the detector output to a 50 ohm load.

The bandwidth of circuit 21 should be very high so that each noise pulse from the photomultiplier 20 will consist of an individual separated pulse, that is, each pulse will return to the zero base line before a new one begins. Using a very fast pulse amplifier 21 in the output circuit reduces the number of random statistical "pile-up" of noise pulses, which could result in spurious echo signals.

A representative output from pulse amplifier 21 is shown in FIG. 2B. The output from pulse amplifier 21 is a series of noise pulses 24a–24g and a signal pulse 25. Dashed line 26 represents the expected magnitude range of single electron noise pulses, and dash line 27 the level to which discriminator 22 is set. It can be expected that only true signal pulses will exceed this discriminator level. The bias, or pulse amplitude, discriminator 22 examines each piece of digital information as to its significance and then rejects or accepts it for later processing circuitry.

To fully understand the principles of this detection system it is necessary to distinguish carefully between:

(1) The "pulses" of light generated by source 10a consisting of a group of many individual photons, commonly $10^{20}$–$10^{25}$, emitted within a short duration time, (2) The "pulses" of light collected by the detector after being reflected from object 13a consisting of a group of photons, commonly $10^3$–$10^5$, within the same short duration time, but received by the detector at some later time determined by the time taken to travel paths 12a and 14a, (3) The "pulses" of electronic charge generated at the input of the detector (commonly photoelectrons emitted from a photocathode) and consisting of a group of electrons, commonly 10–100 electrons, (4) The "pulses" of output charge from the detector corresponding to each of the above groups of input charges, commonly 10–100 electrons times the internal charge gain of the detector, (5) The single electrons generated at the detector input by background light flux, thermionic emission, etc.

(6) The resulting "single electrons" output charge pulses in the detector output circuit consisting of one electron charge times the internal charge gain of the detector, (7) The output pulses 24a, 24b, etc. from amplifier 21 corresponding to "single electron" pulses from the detector, (8) The output pulse, 25, from amplifier 21 corresponding to the group of charges generated by the group of photoelectrons generated, in turn, by the light flux pulse to be detected.

For proper operation it is necessary that the response time of detector 20 and amplifier 21 be long enough such that the group of individual charges comprising the output pulse 25 "pile up" to produce a single large pulse, 25, but be short enough to minimize random 'pile-up' of the "single electron" noise pulses. By selecting a short time duration for the light pulse, which is also advantageous for increasing range accuracy, the combined time constant of detector 20 and amplifier 21 can be made correspondingly short so that individual noise pulses, 24a, 24b, etc. are individually resolved without simultaneously resolving the individual charge pulses comprising signal pulse 25.

The following remarks are a mathematical analysis of the principles behind the novel digital detection scheme.

In the conventional detection scheme, hereinbefore described, the *analogue* continuously varying detector output current under ideal conditions can be represented by the usual shot noise law.

$$i_n{}^2 = 2eI\Delta f$$

where, $i_n$ = RMS noise current;
$e$ = unit charge in the detecting circuit (may be a multielectron charge in photomultipliers);
$I$ = average current; and
$\Delta f$ = observation bandwidth.

In terms of the average rate, $\nu$, of generating the unit charge, $e$, $$i_n{}^2 = 2e^2\nu\Delta f$$

S. O. Rice, in Bell System Technical Journal, vol. 24, p. 74, shows that the number of maxima of a random noise parameter of this type exceeding any instantaneous amplitude is directly proportional to the RMS value, $i_n$. Therefore, the number of false indications; $N_F$, in an optical radar based upon on analogue detector would be given by:

$$N_F \sim i_n \sim \sqrt{2e^2\nu\Delta f} \sim \sqrt{\Delta f}$$

Increasing bandwidth increases the number of possible false indications. Hence, a conflict of alternatives arises; increased ability to detect range differences requires increased bandwidth, but increased bandwidth causes increase in the number of possible false indications in the *analogue* type detector system.

Comparing this with the *digital* type detector system, it will be seen that higher bandwidth, which permits greater range accuracy, decreases the possible number of false indications.

The likelihood of a false noise signal occurring during any sampling time T depends upon the number of true signal electron pulses available during this same time. Take the worst case of a signal pulse consisting of only 2 overlapping single photoelectron pulses (3 or more available photoelectrons would, of course, give even better performance). The likelihood of 2 random events, i.e. a false signal during this same time is given by the following equation derived from Poisson's formula of distribution:

$$P_2 = e - \nu T \frac{(\nu T)^2}{2!}$$

Assuming that $\nu T$, the average number of single events during time T, is considerably less than unity, so that the probability of 3 or more random counts can be neglected for simplicity, and also that the exponential factor $e-\nu T$ is approximately unity, which assumptions can always be met for a small enough sampling time, then the false indications, $N_F$, given by $N_F \sim T^2 \sim 1/(\Delta f)^2$ where the fact that sampling time T, is inversely proportional to circuit bandwidth, $\Delta f$, has been used. Hence the number of false indications $N_F$ is inversely proportional to the square of the circuit response frequency. Validity of the assumption of small sampling times depends, of course, on whether the detector itself is fast enough, and whether the light pulse can be generated within a sufficiently short time interval. Presently, values below $5-10 \times 10^{-9}$ seconds appear feasible for both.

As already pointed out for this invention to be practical the random statistical overlap between noise pulses must be low enough to avoid significant "pile-up" of noise pulses which could result in a spurious echo signal. This is accomplished, as hereinbefore mentioned, by the use of very fast pulse amplifiers, such that the output signal from the multiplier phototube consists of separate pulses. The other requirement is that signal pulse duration be short compared to the amplifier-phototube recovery time, so that "pile-up" does occur for the multiple photoelectrons in the signal pulse.

If typical achievable time magnitudes are substituted "pile-up" can be demonstrated. For a signal pulse of $<10^{-8}$ sec. the photomultiplier itself will often cause "pile-up," but in any case an artificial "pile-up" will occur if the output amplifier time constant is of the order of $10^{-7}$ seconds. On the other hand a typical S20 photocathode emitting $10^3$ to $10^4$ thermionic electrons/sec. will not result in significant "pile-up" because of the slow rate of these pulses compared to the $10^{-7}$ second resolving time. Hence, each noise pulse will appear independently, and be of small magnitude, such that it can be totally removed by the amplitude discriminator circuit. In fact, significantly greater single electron emission rates, up to $10^5-10^6$ per second, and including photoelectrons generated by exposing the detector to background light flux, as in daytime optical radar applications could be tolerated if short light pulse widths and corresponding shorter amplifier time constants were employed.

While I have described above the principles of my invention in connection with specific apparatus, it is to be clearly understood that the specification is presented by way of example and not as a limitation of the scope of my invention, as set forth in the accompanying claims.

I claim:

1. A noise suppressing detector for optical radar in which the employed light pulses have very short durations, comprising:
   a light detector including external signal processing circuitry having an appreciable internal charge gain such that individual photons from an echo of the light signal incident at the input of said light detector cause emission of single electrons which create a large detectable burst of charge at the output thereof, said detector in combination with its external signal processing circuitry possessing a time constant such that bursts of charge generated by the incident return echo light particles from each of said light pulses will "pile-up" at the output creating a large signal amplitude pulse for each of said light pulses in comparison to the low amplitude noise generated single electron pulses which do not "pile-up"; and
   means coupled to said light detector for distinguishing between signal and noise pulses.

2. A noise suppressing detector as in claim 1 and further including a coupling network between said light detector and said distinguishing means, said coupling network having a very high bandwidth such that each output signal and noise pulse will be individually resolved to produce a digital in contrast to analogue type signal.

3. A noise suppressing detector as in claim 2 wherein said distinguishing means includes a pulse amplitude discriminator to examine each pulse applied thereto and signify whether a predetermined pulse amplitude has been exceeded.

4. A noise suppressing detector for optical radar in which the employed signal light pulses have very short durations, comprising:
   a light detector having an appreciable internal charge gain such that individual photons from an echo of the light signal incident at the input thereof cause emission of single electrons which create a large detectable burst of charge at the output thereof,
   an amplifier coupled to the output of said light detector having a time constant such that signal pulse outputs from said light detector will "pile-up" at the output of said amplifier creating a large signal amplitude in comparison to the low amplitude single electron noise pulses which do not pile up; and
   means coupled to said amplifier for distinguishing between signal and noise pulses.

5. An optical radar system comprising an optical pulse source for generating an optical pulse of very short duration;
   a return echo detector including a photomultiplier having a time constant somewhat greater than the duration of said optical pulse;
   a high bandwidth coupling circuit coupled to said photomultiplier to ensure that the output signals therefrom will be individual pulses of a digital nature rather than an analogue signal; and
   a pulse amplitude discriminator for distinguishing between the amplitudes of received optical pulses and noise pulses.

6. A noise suppressing detector as in claim 2 wherein said coupling network has a bandwidth approaching infinity.

7. A noise suppressing detector for optical radar in which the employed light pulses have very short durations, comprising:
   a photomultiplier having a photocathode, at least one dynode and a collector, said photomultiplier possessing a time constant somewhat greater than the employed signal light pulses;
   a high bandwidth amplifier coupled to the collector of said photomultiplier such that individual pulses from the photomultiplier collector will remain resolved; and
   an amplitude discriminator for selecting only those pulses that exceed a predetermined amplitude.

8. A noise suppressing detector for optical radar in which the employed light pulses have very short durations, comprising:
   a light detector including external signal processing circuitry having an appreciable internal charge gain such that individual light particles from an echo of the light signal incident at the input of said light detector cause emission of single electrons which create a large detectable burst of charge at the output of said light detector, said light detector in combination with said external circuitry possessing a time constant somewhat greater than the duration of said employed light pulses thus causing echo light pulse generated photoelectron pulses to "pile-up" at the output creating a large signal amplitude relative to any low amplitude noise pulses;

means for distinguishing between signal and noise pulses; and means coupling said light detector to said distinguishing means for minimizing impedance mismatch, said coupling means having a very high bandwidth so that individual signal and noise pulses will be resolved.

References Cited

UNITED STATES PATENTS

| | | | |
|---|---|---|---|
| 3,053,134 | 9/1962 | Bjornson | 88—1 |
| 3,181,365 | 5/1965 | Maninger | 340—228 |
| 3,333,106 | 7/1967 | Fischer | 250—214 |

RALPH G. NILSON, Primary Examiner

MARTIN ABRAMSON, Assistant Examiner

U.S. Cl. X.R.

250—199, 207